(12) United States Patent
Dentici

(10) Patent No.: US 8,615,987 B2
(45) Date of Patent: Dec. 31, 2013

(54) METHOD FOR CONTROLLING FLUID INJECTED QUANTITY IN A $NO_x$ REDUCTION SYSTEM EMPLOYING A SCR CATALYST

(75) Inventor: Ignazio Dentici, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 512 days.

(21) Appl. No.: 12/946,754

(22) Filed: Nov. 15, 2010

(65) Prior Publication Data

US 2011/0120092 A1    May 26, 2011

(30) Foreign Application Priority Data

Nov. 16, 2009 (GB) .................................. 0920021.3

(51) Int. Cl.
*F01N 3/20* (2006.01)

(52) U.S. Cl.
USPC ................... 60/286; 60/274; 60/287; 60/295; 60/301

(58) Field of Classification Search
USPC ............ 60/274, 276, 282, 286, 287, 295, 301
See application file for complete search history.

(56) References Cited

U.S. PATENT DOCUMENTS

| | | | |
|---|---|---|---|
| 7,743,605 B2 | 6/2010 | Katou et al. | |
| 2002/0189246 A1 | 12/2002 | Hepburn et al. | |
| 2006/0130458 A1* | 6/2006 | Solbrig | 60/286 |
| 2008/0138221 A1 | 6/2008 | Jochumsen et al. | |
| 2010/0122520 A1* | 5/2010 | Han | 60/274 |

FOREIGN PATENT DOCUMENTS

| | | |
|---|---|---|
| EP | 1676628 A1 | 7/2006 |
| EP | 2034147 A1 | 3/2009 |

OTHER PUBLICATIONS

British Patent Office, British Search Report for Application No. GB0920021.3, dated Feb. 3, 2010.

* cited by examiner

*Primary Examiner* — Thomas Denion
*Assistant Examiner* — Jorge Leon, Jr.
(74) *Attorney, Agent, or Firm* — Ingrassia Fisher & Lorenz, P.C.

(57) ABSTRACT

A method is provided for controlling a Diesel Emission Fluid (DEF) injected quantity in a $NO_x$ reduction system employing a Selective Catalytic Reduction (SCR) catalyst, and a DEF injector for injecting the DEF to reach said SCR catalyst. The method includes determining a required quantity of DEF for the SCR catalyst at a given time. If the required quantity of DEF is at least equal to a threshold quantity, then a DEF injection is activated, otherwise the required quantity of DEF is stored in memory of an Electronic Control Unit (ECU). After a period, a further required quantity of DEF to be added to the required quantity is determined to determine a new required quantity of DEF. The new required quantity of DEF is continuously updated until the new required quantity of DEF is at least equal to said threshold quantity, at which point the DEF injection of the new required quantity of DEF is activated.

11 Claims, 2 Drawing Sheets

METHOD FOR CONTROLLING FLUID INJECTED QUANTITY IN A $NO_x$ REDUCTION SYSTEM EMPLOYING A SCR CATALYST

CROSS-REFERENCE TO RELATED APPLICATION

This application claims priority to British Patent Application No. 0920021.3, filed Nov. 16, 2009, which is incorporated herein by reference in its entirety.

TECHNICAL FIELD

The technical field relates to a method for controlling a fluid injected quantity, in particular of a Diesel Emission Fluid (DEF), in a $NO_x$ reduction system employing a Selective Catalytic Reduction (SCR) catalyst in an internal combustion engine.

BACKGROUND

It is known that SCR systems in Diesel engines are able to achieve a reduction of $NO_x$ emissions by injecting in the exhaust pipe a Diesel Emission Fluid (DEF). An example of such fluid commercially available and used in automotive application is a solution made up from 32.5% Urea mixed with de-ionized water that is maintained at a suitable pressure setpoint by a pressure regulation circuit. The DEF is injected in the exhaust gas by a dedicated injector mounted on the exhaust pipe, in such a way that it can be mixed into the exhaust gas taking advantage of the exhaust gas flow. The SCR catalyst is mounted downstream of the injector with respect to the exhaust gas flow, so that the DEF added to a stream of gas is absorbed inside the catalyst, where due to the temperature of the system the nitrogen oxides are converted according to the following chemical equation (stoichiometric reaction):

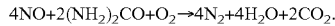

$$4NO+2(NH_2)_2CO+O_2 \rightarrow 4N_2+4H_2O+2CO_2.$$

A typical schematic illustration of the exhaust architecture for a known SCR system is shown in FIG. 1. The scheme includes a DEF tank provided with a DEF pressure regulator, used to maintain DEF pressure at a certain setpoint to maximize injection spray efficiency. The SCR system includes also a DEF injector to inject DEF into the exhaust pipe of the engine in order to reach the SCR catalyst. Because of the working principle of the SCR system, it is not required that the injector ensures a continuous DEF flow, but the goal of the system is to maintain a certain level of DEF absorbed in the catalyst.

SCR systems have been used in automotive applications for heavy truck applications, but these systems are now requested also for passenger car applications to fulfill Euro 5 and Euro 6 $NO_x$ emission legislations. For this reason, since DEF injectors used in SCR systems have been developed in the past for heavy truck applications, they have static flow and dynamic flow rates higher than what is now requested for passenger car applications. This means that in these latter applications, a typical DEF injector works only in the small quantity injection area of its characteristic, an area that is typically non linear, that has bad precision and robustness and that is also severely subject to aging drift.

By contrast, to develop a DEF injector with lower static flow and dynamic flow rates is very challenging also from the hydraulic perspective, due to the hole diameter and to the spray geometry, this latter factor being dependent upon the number of holes.

In addition, recent legislation requires that a deviation of more than 50% between the average reagent consumption and the average demanded reagent consumption by the engine system over a period of 30 minutes of vehicle operation shall result in the activation of the driver warning system. Tighter standards may be imposed in the future.

In SCR systems, a known $NO_x$ reduction strategy, using as input a $NO_x$ sensor, request a certain injection mass for the injection strategy, with a certain refresh period. The injection strategy transforms the input, namely the mass request, in an output for the injector that typically is the opening time for the injector. The assumption is that the injector can be driven with a minimum injection period between one injection and the next one, and that two injections can be distant N times this minimum injection period.

In a hypothetical linear behavior of the injector, the requested DEF injection quantity is transformed in an opening time for the injector (directly from the characteristic of the DEF injector) and eventually corrected via a calibration map. But, in some engine operating points, depending also on the calibration of the $NO_x$ reduction strategy and on its model behavior, the requested DEF injection mass can be so little that the opening time of the injector is below a minimum mechanical threshold and the injected quantity can be completely different from the request. Injected quantity may even be zero in the case that the injector remains hydraulically closed. In general, it may be said that in these conditions for little quantities of requested DEF the injector behavior is not linear. Also, the DEF injector behavior gets worse with injector aging. This problem causes errors in the estimation of the DEF injected mass, and has a negative influence on emissions and also jeopardizes the fulfillment of emission legislation.

In view of the foregoing, at least a first object is to provide a method for controlling DEF injected quantity in a $NO_x$ reduction system employing a SCR catalyst that allows for the injection of correct quantities of fluid in all situations of use of the vehicle. At least another object is to provide a method for controlling a DEF injected quantity that allows an optimal control of such fluid in passenger cars. At least another object is to provide a method for controlling the DEF injected quantity without using complex devices and by taking advantage of the computational capabilities of the Electronic Control Unit (ECU) of the vehicle, and at least another object of the present invention is to meet these goals by means of a simple, rational and inexpensive solution. In addition, other objects, desirable features and characteristics will become apparent from the subsequent detailed description, and the appended claims, taken in conjunction with the accompanying drawings and this background.

SUMMARY

A method, by an engine, by a computer program and by computer program product, and by an electromagnetic signal provided for controlling a Diesel Emission Fluid (DEF) injected quantity in a $NO_x$ reduction system employing a Selective Catalytic Reduction (SCR) catalyst, and a DEF injector for injecting the DEF to reach the SCR catalyst. Prior to the method, a threshold quantity is determined that is representative for a given DEF injector; this threshold quantity is a minimum injected fluid quantity that provides a substantially linear behavior of said given DEF injector. The method comprising at least the following steps of determining a required quantity of Diesel Emission Fluid (DEF) for the SCR catalyst at a given instant, if the required quantity of Diesel Emission Fluid (DEF) is at least equal to the threshold quantity, then activate the DEF injection, otherwise the required quantity of DEF is stored in memory of an Electronic Control Unit (ECU), and, after a predetermined or random period of time, a further required quantity of DEF to be added to the required quantity is determined to determine a new required quantity of DEF. The new required quantity of DEF is continuously updated until the new required quantity of DEF is at least equal to said threshold quantity, at which point the DEF injection of the new required quantity of DEF is activated.

According to an embodiment, the activation of the injector is suitable for injecting a quantity of DEF that is at least equal to said threshold quantity. According to a further embodiment, the activation of the injector is suitable for injecting a quantity of DEF equal to the sum of quantities determined in said summing step. Preferably, the injected quantity is obtained by setting the value of the injection time period of activation of the injector.

According to a further embodiment, the injection time period of activation of the injector is calculated by multiplying the injection time period needed for a single quantity of DEF required by the number of DEF requests needed to reach or exceed said threshold quantity.

The method according to the invention can be realized in the form of a computer program comprising a program-code to carry out all the steps of the method of the invention and in the form of a computer program product comprising means for executing the computer program. The computer program product comprises, according to a preferred embodiment of the invention, a control apparatus for an IC engine, for example the ECU of the engine, in which the program is stored so that the control apparatus defines the invention in the same way as the method. In this case, when the control apparatus executes the computer program all the steps of the method according to the invention are carried out.

The method according to the invention can be also realized in the form of an electromagnetic signal, said signal being modulated to carry a sequence of data bits which represent a computer program to carry out all steps of the method of the invention.

An embodiment of the invention further provides for an internal combustion engine specially arranged for carrying out the method of the invention.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit applications and uses. Furthermore, there is no intention to be bound by any theory presented in the preceding background or summary or the following detailed description.

Figure 1:
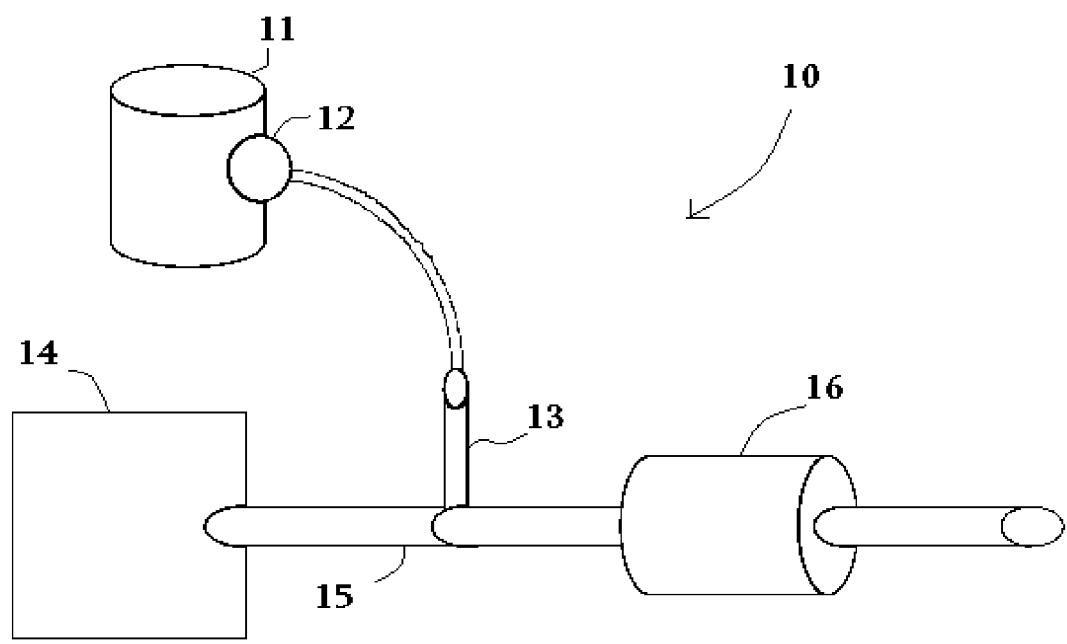
FIG. 1 is a schematic representation of Selective Catalytic Reduction (SCR) catalyst system in an internal combustion engine for a $NO_x$ reduction strategy and suitable for the actuation of the method in accordance with an embodiment of the invention.

A typical exhaust architecture for an SCR system suitable for the actuation of the method is shown in FIG. 1. The SCR system 10 includes a Diesel Emission Fluid (DEF) tank 11 provided with a DEF pressure regulator 12, used to maintain DEF pressure at a certain setpoint to maximize injection spray efficiency. The SCR system includes also a DEF injector 13 to inject DEF into the exhaust pipe 15 of the engine 14 in order to reach the SCR catalyst 16.

Figure 2:
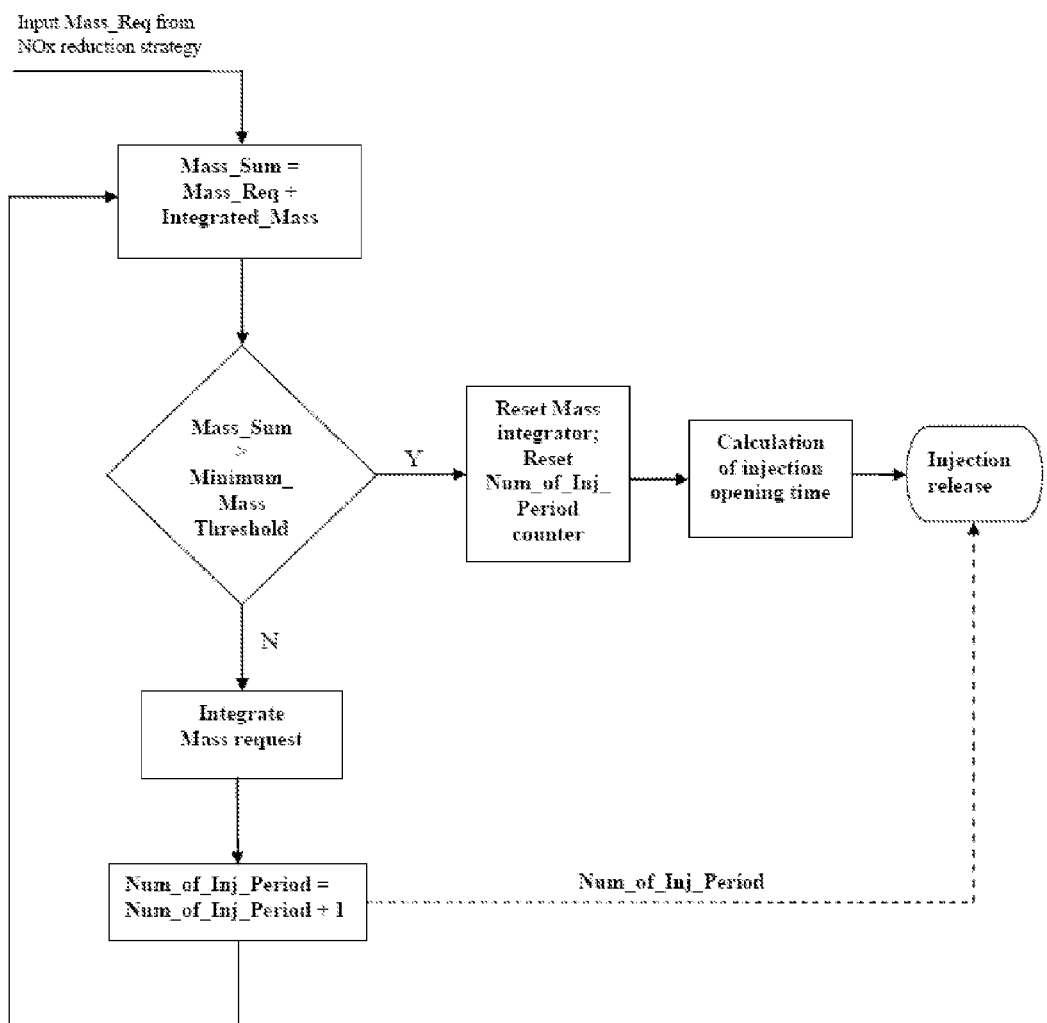
FIG. 2 is schematic representation of the steps of the method of an embodiment of the invention.

The method, illustrated in FIG. 2, changes the injection repetition period in order to improve the injected quantity precision in all working conditions. Injectors have their own characteristic curve that correlates the aperture time of the injector to the mass of DEF injected. Also, such curve is generally linear only after a minimum threshold Minimum_Mass_Threshold that depends on the mechanical and hydraulic behavior of the injector. Therefore such quantity can be considered the minimum injected quantity that can guarantee the requested accuracy in the injector performance. Therefore, in the method, a threshold quantity Minimum_Mass_Threshold is determined for a given DEF injector, the threshold quantity being the minimum injected fluid quantity that guarantees the linear behavior of the given injector.

In the method, time is subdivided in a plurality of predetermined or random intervals in each of which a calculation is performed to determine the requested quantity of DEF Mass_req. Such quantity is preferably determined in mass units. After each of these calculations, the method of injection compares the quantity Mass_req with the Minimum_Mass_Threshold, and if the input Mass_req is higher than the Minimum_Mass_Threshold, the injector opening time is calculated for the given value of Mass_req and the injection is released with an Injection_Time_Period base. Otherwise, if the input Mass_req is lower than the Minimum_Mass_Threshold, the injection is not released and at the same time, a counter Num_of_Inj_Period is incremented.

In the next calculation, a new input Mass_Req is added to the previously calculated one, eventually using a temporary storage variable Integrated_Mass, in order to obtain a sum Mass_Sum of such quantities and such sum is compared with the Minimum_Mass_Threshold quantity value. If the value of Mass_Sum is still lower than the Minimum_Mass_Threshold, the injection is not released and again a new mass request is calculated and summed to the previous Mass_sum value as in the previous step. A counter Num_of_Inj_Period is also incremented. This loop is repeated until the Mass_sum value is higher than the Minimum_Mass_Threshold. In this case the injection is released and to actually perform the injection, the injector opening time is calculated on the basis of the Mass_Sum value. Furthermore the Mass_Sum and Integrated_Mass values are reset; the number of injection periods counter is reset and the injection time period is calculated.

The injection time period may for example be calculated may by setting it equal to Injection_Time_Period*Num_of_Inj_Period, namely multiplying the value Injection_Time_Period of a single mass request by the number of mass requests needed to reach or exceed the threshold quantity. The injection time period may also be calculated in such a way that, on reaching the threshold condition, a quantity of DEF that is least equal to said threshold quantity is injected. Summing up the various mass requests may be performed by a software integrator.

The method has several important advantages and benefits. First, it allows increased robustness, reliability and precision of a diesel emission fluid injected quantity, also avoiding problems due to injector aging drift. The method can be tailored to any injector characteristic curve, giving the required flexibility to apply it to any vehicle and in particular to automobiles or passenger cars. Also, the method allows an improvement of $NO_x$ emissions, ensuring emission legislation requirements for the vehicles to which it is applied.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for controlling a Diesel Emission Fluid (DEF) injected quantity in a $NO_x$ reduction system employing a Selective Catalytic Reduction (SCR) catalyst, and a DEF injector adapted to inject said DEF to reach said SCR catalyst, the method comprising:
   determining a required quantity of DEF for the SCR catalyst at a given time;
   activating a DEF injection if the required quantity of DEF is at least equal to a threshold quantity, wherein said threshold quantity is a minimum injected fluid quantity that provides a substantially linear behavior for a given DEF injector;
   storing in memory of an Electronic Control Unit (ECU) the required quantity of DEF if the required quantity of DEF is less than said threshold quantity and after a period determining a further required quantity of DEF to be added to the required quantity of DEF to determine a new required quantity of DEF;
   continuously updating the new required quantity of DEF until the new required quantity of DEF is at least equal to said threshold quantity; and
   activating the DEF injection of the new required quantity of DEF.

2. The method as in claim 1, further comprising:
   setting a value of an injection period of activation of the DEF injector to obtain the threshold quantity.

3. The method as in claim 1, further comprising:
   multiplying an injection period needed for a single quantity of DEF by a number of DEF requests needed to at least reach said threshold quantity to calculate the injection period of activation of the DEF injector.

4. An internal combustion engine, comprising:
   a $NO_x$ reduction system employing a Selective Catalytic Reduction (SCR) catalyst;
   an Emission Fluid (EF) injector adapted to inject said EF to reach said SCR catalyst; and
   a control unit configured to:
      determine a required quantity of EF for the SCR catalyst at a given time;
      activate an EF injection if the required quantity of EF is at least equal to a threshold quantity, wherein said threshold quantity is a minimum injected fluid quantity that provides a substantially linear behavior for a given EF injector;
      store in memory of the control unit the required quantity of EF if the required quantity of EF is less than said threshold quantity and after a period determining a further required quantity of EF to be added to the required quantity of EF to determine a new required quantity of EF;
      continuously update the new required quantity of EF until the new required quantity of EF is at least equal to said threshold quantity; and
      activate the EF injection of the new required quantity of EF.

5. The internal combustion engine of claim 4, where the internal combustion engine is a Diesel engine.

6. The internal combustion engine as in claim 4, wherein the control unit is further configured to:
   set a value of an injection period of activation of the EF injector to obtain the threshold quantity.

7. The internal combustion engine as in claim 4, wherein the control unit is further configured to:
   multiply an injection period needed for a single quantity of EF by a number of EF requests needed to at least reach said threshold quantity to calculate the injection period of activation of the EF injector.

8. The internal combustion engine as in claim 4, wherein the control unit is an Electronic Control Unit (ECU).

9. A non-transitory computer readable medium embodying a computer program product, said computer program product comprising:
   a program, for controlling Diesel Emission Fluid (DEF) injected quantity in a $NO_x$ reduction system employing a Selective Catalytic Reduction (SCR) catalyst, and a DEF injector adapted to inject said DEF to reach said SCR catalyst, the program configured to:
      determine a required quantity of DEF for the SCR catalyst at a given time;
      activate a DEF injection if the required quantity of DEF is at least equal to a threshold quantity, wherein said threshold quantity is a minimum injected fluid quantity that provides a substantially linear behavior for given DEF injector;
      store, in memory of an Electronic Control Unit (ECU), the required quantity of DEF if the required quantity of DEF is less than said threshold quantity and after a period determining a further required quantity of DEF to be added to the required quantity of DEF to determine a new required quantity of DEF;
      continuously update the new required quantity of DEF until the new required quantity of DEF is at least equal to said threshold quantity; and
      activate the DEF injection of the new required quantity of DEF.

10. The non-transitory computer readable medium embodying the computer program product as in claim 9, wherein the program is configured to set a value of an injection period of activation of the DEF injector to obtain the threshold quantity.

11. The non-transitory computer readable medium embodying the computer program product as in claim 9, wherein the program is configured to multiply an injection period needed for a single quantity of DEF by a number of DEF requests needed to at least reach said threshold quantity to calculate the injection period of activation of the DEF injector.

* * * * *